Figure 1:
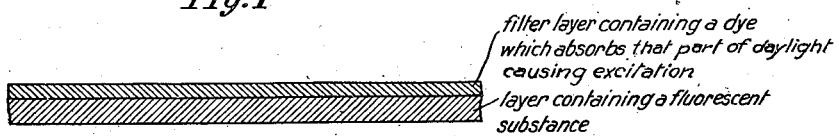

March 21, 1939.  J. EGGERT ET AL  2,150,966

INTENSIFYING AND FLUORESCENT SCREEN

Filed Oct. 19, 1935 filter layer containing a dye which absorbs that part of daylight causing excitation
layer containing a fluorescent substance layer containing a fluorescent material and a dye absorbing that part of daylight causing excitation John Eggert
Fritz Luft
Inventors By Their Attorneys Patented Mar. 21, 1939

2,150,966

UNITED STATES PATENT OFFICE 2,150,966

INTENSIFYING AND FLUORESCENT SCREEN

John Eggert and Fritz Luft, Leipzig, Germany, assignors to Agfa Ansco Corporation, Binghamton, N. Y., a corporation of New York Application October 19, 1935, Serial No. 45,780
In Germany March 15, 1933

4 Claims. (Cl. 250—80)

Our present invention relates to an intensifying or fluorescent screen for X-ray work. It is a continuation-in-part of my co-pending application Ser. No. 714,729, filed March 8, 1934 now U. S. Patent 2,076,984.

One of its objects is an improved screen of this kind. Further objects will be seen from the detailed specification following hereafter.

Many intensifying and fluorescent screens for use in X-ray work have the disadvantage of being phosphorescent, that is to say, the screens not only emit the desired fluorescent radiation during the diagnostic exposure, but also produce after exposure a phosphorescent light at the places previously struck by the X-rays, so that on the screens the successively produced phosphorescent and fluorescent pictures become mixed, a fact which may render difficult the interpretation of the inspected or photographed picture. As known, it is very difficult to free the luminescent substances used in the manufacture of intensifying screens and fluorescent screens for X-ray work from substances that phosphoresce when struck by X-rays.

This phosphorescent light frequently has a color different from that of the fluorescent light. By the invention the detrimental effect caused by the phosphorescent substances contained in the fluorescent layer may be eliminated by coating the intensifying screen or the fluorescent screen with a filter layer which transmits the fluorescent light completely or in greater part, but absorbs the phosphorescent rays. By this expedient the manufacture of intensifying and fluorescent screens for X-ray work is considerably cheapened and improved, because on the one hand the complicated process of removing the phosphorescent admixtures from the fluorescent substances is rendered unnecessary and on the other hand there is a wider choice of fluorescent substances since those which give fluorescence and also phosphorescence substances can be used. If required, the filter dyestuff may be added directly to the binding agent carrying the fluorescent substance instead of being incorporated in a special filter layer.

Furthermore, substances are known, such as zinc sulfide and sulfides of the alkaline earths, which fluoresce and phosphoresce when struck by X-rays or by daylight. If such substances are used for the manufacture of intensifying screens, these screens must, of course, always be protected from daylight, thus causing much trouble in X-ray work.

Now, according to Stoke's law, these luminescent rays always have a greater wave length than the exciting primary rays. By providing fluorescent screens with a filter (in the way above referred to, i. e. applying a filter layer by casting or dyeing the layer throughout its thickness) which absorbs only the exciting light, and transmits the luminescent rays completely or in greater part, the risk that such a screen be excited in daylight is greatly diminished, without the excitability by X-rays being reduced or the emission of the fluorescent rays being materially hindered. With a screen protected in this manner, therefore, X-ray work may be done almost irrespective of any previous exposure to daylight.

In the following table there are given some materials which are used for manufacturing intensifying or fluorescent screens and materials which they may contain as impurity. There is furthermore indicated the fluorescent and phosphorescent light emanated by these materials and the filter dye to be used for absorbing the phosphorescent light.

| Main constituent | Impurity | Color of fluorescence | Color of phosphorescence | Filter dye |
|---|---|---|---|---|
| ZnS activated with Ag | Mn | Dark blue | Orange | Toluidine blue (cf. Schultz Farbstofftabellen 7th edition No. 1041) or crystal violet (hexamethylpararosaniline). |
| Do | Cu | do | Green | Rose bengale (cf. Schultz Farbstofftabellen 7th edition No. 889). |
| ZnS activated with Cd | Mn | Orange yellow | do | Orange 2 (cf. Schultz Farbstofftabellen 7th edition No. 189). |
| CaWO₄ | ZnS activated with Mn. | Blue | do | Rose bengale (cf. Schultz Farbstofftabellen 7th edition No. 889). |

The following examples illustrate the invention:

*Example 1.*—An intensifying screen for X-ray work consists of a support, for instance stiff paper, and a fluorescent layer, containing as a fluorescent substance, zinc sulfide activated with silver. This layer is coated with another layer containing as a filter dyestuff crystal violet in gelatin as a binding agent. If the zinc sulfide activated with silver and fluorescing with a blue color, contains as usual traces of copper, the screen will phosphoresce with a green light, which is absorbed by the filter layer containing crystal-violet. The blue fluorescent light penetrates the filter layer unweakened.

*Example 2.*—An intensifying screen containing as an active substance zinc sulfide activated with copper is coated with a green filter layer of gelatin dyed with tartrazine and patent blue. This filter layer prevents the screen from being excited by daylight by absorbing the blue rays exciting phosphorescence. On the contrary, X-rays which are not absorbed by such a filter excite a fluorescent radiation. The yellowish-green fluorescence light produced is transmitted by the filter layer.

The following table indicates some examples of a fluorescent screen which may be excited by daylight and the filter dyes to be used for avoiding the daylight excitation so that the fluorescent screen is excited only by X-rays:

| Fluorescent material | Color of fluorescence | Color of the exciting light | Color of filter dye | Dye |
|---|---|---|---|---|
| ZnS activated with Cu. | Green | Blue and violet. | Green | Patent green [1] or a mixture of patent blue [2] and tartrazine.[3] |
| ZnS activated with Cd. | Orange | Green to violet. | Orange | Orange 2.[4] |
| (CdZn)S activated with Ag. | Yellow | Green to blue. | Yellow | Tartrazine.[4] |

[1] See Schultz Farbstofftabellen 7th edition No. 727.
[2] See Schultz Farbstofftabellen 7th edition No. 826.
[3] and [4] See Schultz Farbstofftabellen 7th edition No. 737.
[4] See Schultz Farbstofftabellen 7th edition No. 189.

Figure 2:
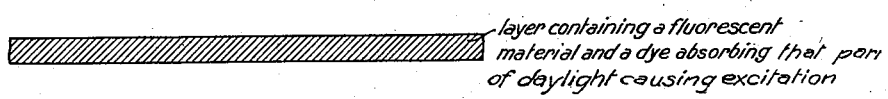

Our invention is illustrated in the accompanying drawing in which Fig. 1 shows a modification in which the layer containing the fluorescent material is provided with a filter layer for absorbing that part of daylight causing excitation and Fig. 2 shows a modification in which the layer containing the fluorescent material is colored throughout by a dye absorbing that part of daylight causing excitation.

What we claim is:

1. An intensifying or fluorescent screen for X-ray work which comprises uniformly distributed in a binding agent a fluorescent material which fluoresces under the influence of daylight and also X-rays and a dye absorbing that part of daylight causing excitation and permeable for the fluorescent rays emanating from the fluorescent material on excitation by X-rays.

2. An intensifying or fluorescent screen for X-ray work which comprises in its active layers a fluorescent material which fluoresces under the influence of daylight and also X-rays and a dye absorbing that part of daylight causing excitation and permeable for the fluorescent rays emanating from the fluorescent material on excitation by X-rays.

3. An intensifying or fluorescent screen for X-ray work which comprises a layer containing a fluorescent material which fluoresces under the influence of daylight and also X-rays and a filter layer containing a dye absorbing that part of daylight causing excitation and permeable for the fluorescent rays emanating from the fluorescent material on excitation by X-rays.

4. An intensifying or fluorescent screen for X-ray work which comprises a layer containing zinc sulfide activated with copper and coated on this layer a filter layer of gelatin, dyed with a mixture of tartrazine and patent blue.

JOHN EGGERT.
FRITZ LUFT.